United States Patent [19]
Mizukami

[11] Patent Number: 5,272,622
[45] Date of Patent: Dec. 21, 1993

[54] NUMERICAL CONTROL INFORMATION GENERATING APPARATUS

[75] Inventor: Yuto Mizukami, Niwa, Japan

[73] Assignee: Okuma Corporation, Aichi, Japan

[21] Appl. No.: 797,074

[22] Filed: Nov. 25, 1991

[30] Foreign Application Priority Data

Nov. 29, 1990 [JP] Japan .................... 2-332328

[51] Int. Cl.$^5$ ............................................ G06F 15/46
[52] U.S. Cl. .......................... 364/191; 364/474.26
[58] Field of Search ............. 364/191, 474.24, 474.25, 364/474.26, 474.22

[56] References Cited

U.S. PATENT DOCUMENTS

| | | | |
|---|---|---|---|
| 4,723,203 | 2/1988 | Kishi et al. | 364/191 |
| 4,736,306 | 4/1988 | Christensen et al. | 364/191 |
| 4,928,221 | 5/1990 | Belkhiter | 364/191 |

Primary Examiner—Jerry Smith
Assistant Examiner—Paul Gordon
Attorney, Agent, or Firm—Wenderoth, Lind & Ponack

[57] ABSTRACT

A machining region which is determined from an inputted before-machining shape and an inputted after-machining shape is divided and the divided machining regions are united to form a united machining region. An optimum machining process is obtained by selecting an optimum combination of the machining regions based on parameters set in advance, and determining a machining method for the united machining region. That is, a numerical control information generating apparatus generates numerical control information by determining a machining method from a before-machining shape and an after-machining shape by generating a machining region from the before-machining shape and after-machined shape, judging pattern elements forming an angle to a Z-axis of more than a predetermined value among a series of pattern elements constituting the generated machining region, dividing the machining region by lines which are parallel to the Z-axis and each pass through a corresponding starting point of a judged pattern element and lines which are parallel to the Z-axis and each pass through a corresponding end point of the judged pattern element region, and uniting divided machining regions based on predetermined parameters so as to determine a machining method for the united machining region.

2 Claims, 11 Drawing Sheets

NUMERICAL CONTROL INFORMATION GENERATING APPARATUS

BACKGROUND OF THE INVENTION

This invention relates to a numerical control information generating apparatus which generates a numerical control information.

Nowadays, there has been widely used a numerical control information generating apparatus capable of inputting data in an interactive manner by an operator upon generating numerical control information to be inputted to a numerically controlled machine tool. If the numerical control information generating apparatus as such is provided with a kind of material to be machined, a before-machining shape, an after-machining shape, etc., the numerical control information generating apparatus automatically determines a machining method (machining region, cutting direction, cutting tool, cutting condition, sequence of operations, etc.,) to generate the numerical control information.

Figure 1A:
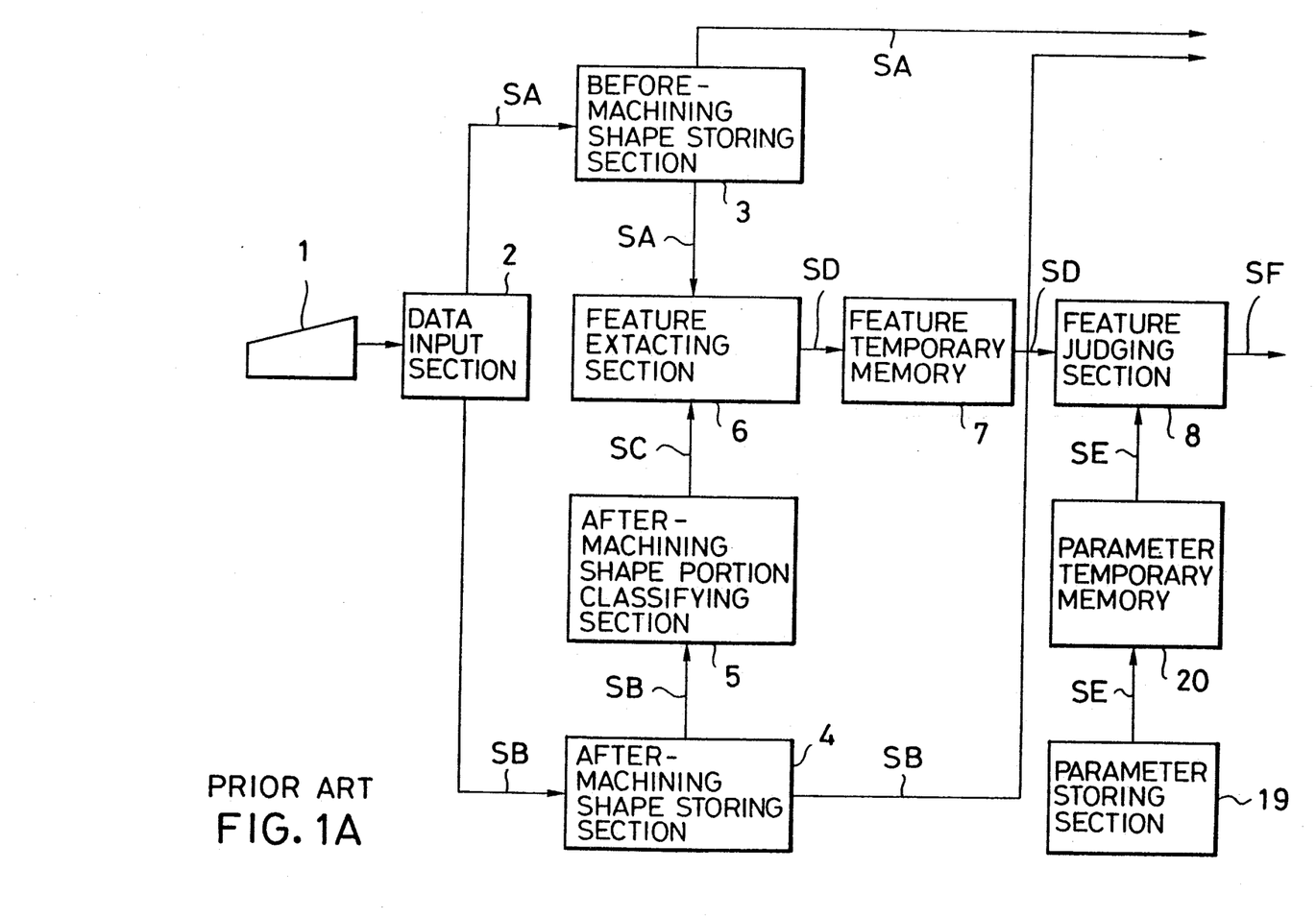
FIGS. 1A and 1B are block diagrams showing an example of the conventional numerical control information generating apparatus.
Figure 1B:
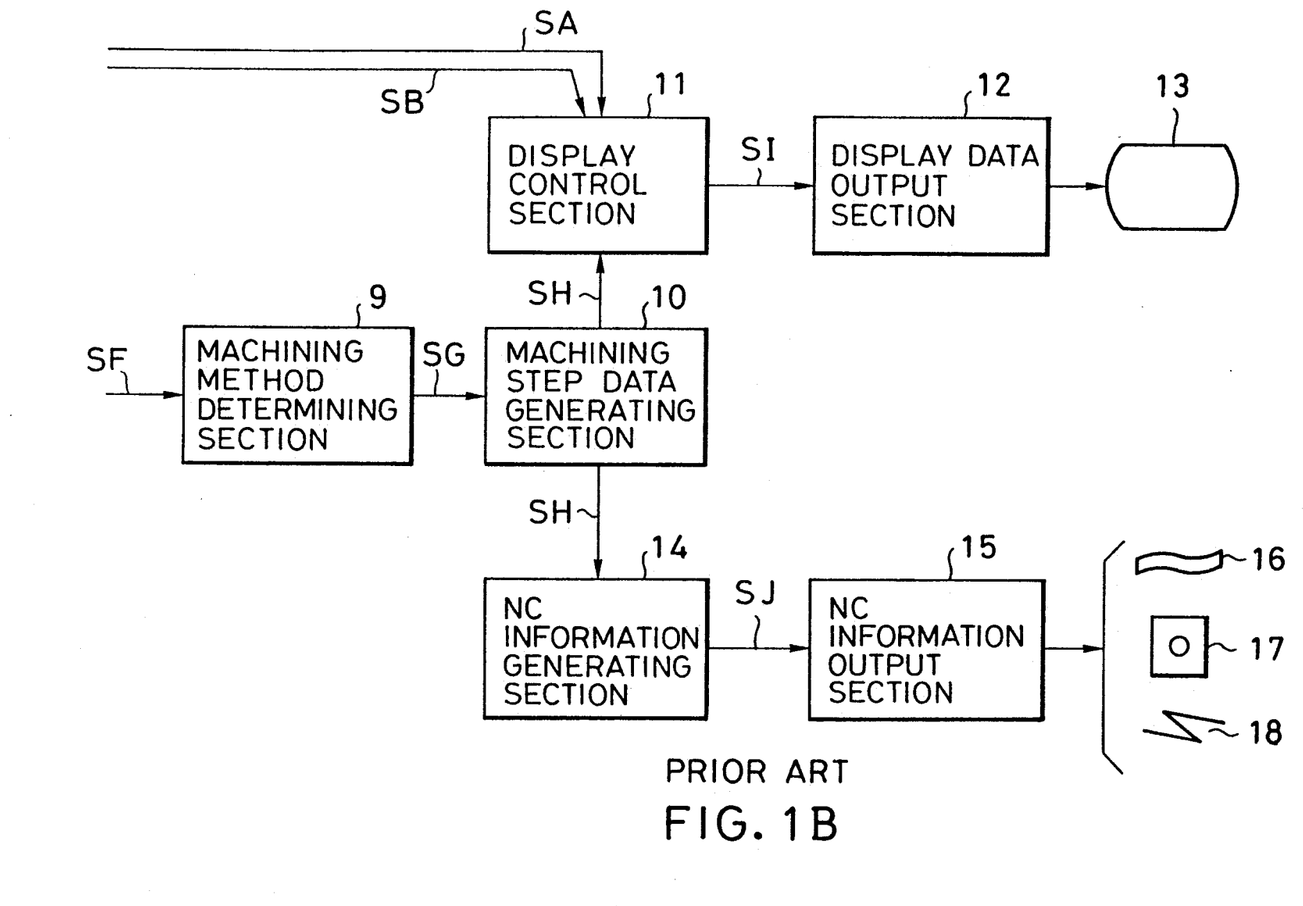

FIGS. 1A and 1B are block diagrams showing an embodiment of a conventional numerical control information generating apparatus in a numerically controlled lathe. In this configuration, a before-machining shape SA, as well as an after-machining shape SB inputted through an operation control panel 1 such as a keyboard or the like by an operator are read in a data input section 2 to be analyzed, and then are stored respectively in a before-machining shape storing section 3 and an after-machining shape storing section 4. The after-machining shape SB being stored in the after-machining shape storing section 4 is read into an after-machining shape-portion classifying section 5 to be decomposed into various pattern elements. The decomposed pattern elements are classified properly according to the portion to be machined, or the cutting direction, and the classified data are read into a feature extracting section 6 as an after-machining-shape classification data SC.

The after-machining-shape classification data SC which the feature extraction section 6 has read out of the after-machining shape-portion classifying section 5 are compared with the before-machining shape SA which the feature extracting section 6 has read out of the before-machining shape storing section 3. From this comparison, shape features SD which are used as factors to determine the machining method, is extracted to be stored in a feature temporary memory 7. Subsequently, the shape features SD loaded into a feature judging section 8 are compared therein with a machining method judgement parameters SE which are read out of a parameter storing section 19 through a parameter temporary memory 20 by the feature judgement section 8. The resultant is outputted as feature comparison data SF to be transmitted to a machining after-machining determining section 9 and a machining method SG is determined. This machining method SG is read into a machining step data generating section 10, and analyzed to generate machining step data SH for each operation step including the cutting shape, the cutting tool, the cutting condition, the sequence of cutting and the like.

The machining step data SH generated in the machining step data generating section 10, the before-machining shape SA stored in the before-machining shape storing section 3 as well as the after-machining shape SB stored in the after-machining shape storing section 4 are read in by a display control section 11 to be transformed into display data SI. The transformed data is adapted to be displayed via a display data output section 12 on a display device 13.

On the other hand, the machining step data SH generated in the machining step data generating section 10 is fed into a numerical control information generating section 14 to be coded, and the coded data are outputted as a numerical control information SJ via a numerical control information output section 15 to a magnetic tape 16, a floppy disc 17, a communication signal 18 or the like.

Figure 2:
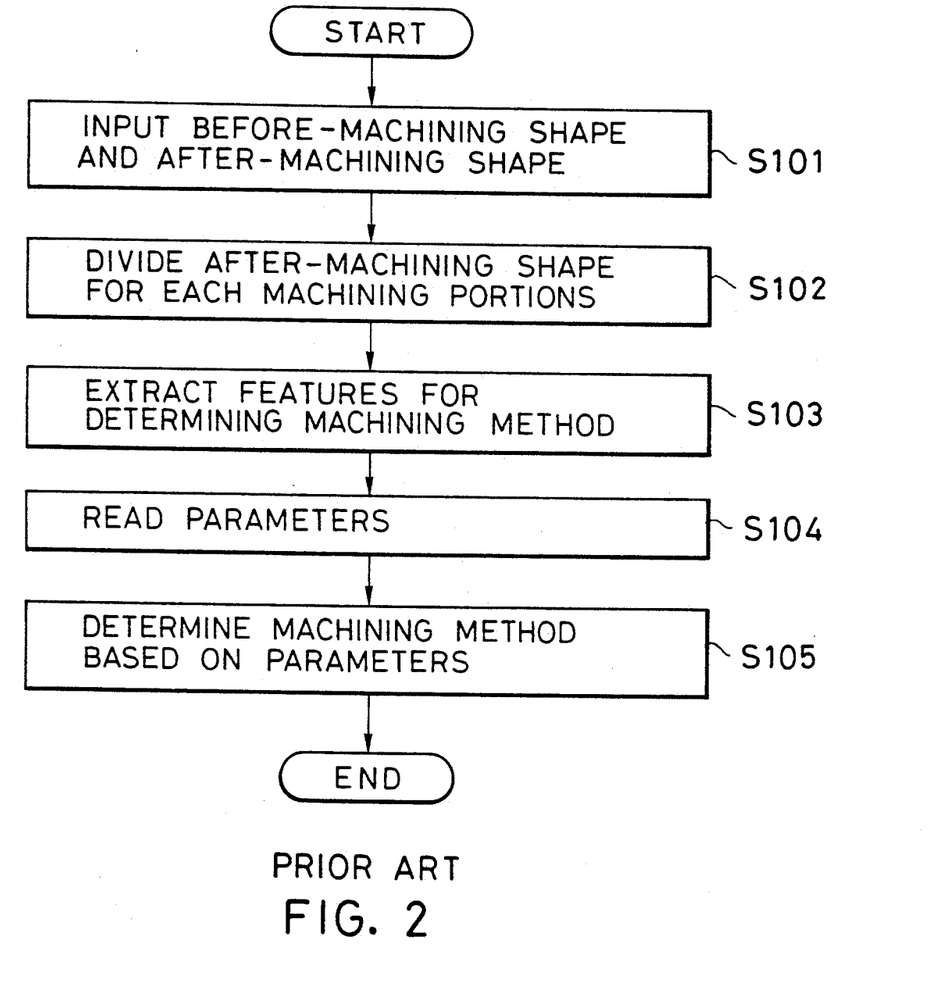
FIG. 2 is a flow chart showing the operational example of the same.

FIG. 2 is a flow chart showing an operational example of the main part of the conventional numerical control information generating apparatus described above. At first, the data input section 2 stores the before-machining shape SA and the after-machining shape SB which are inputted through the operation control panel 1, respectively into the before-machining shape storing section 3 and the after-machining shape storing section 4 (Step S101). The after-machining shape-portion classifying section 5 loads the after-machining shape SB stored in the after-machining shape storing section 4 to be decomposed into pattern elements. Then, a judgement is made as to whether the machining portion suitable for each pattern element belongs to the inner diameter portion or the outer diameter portion, and further another judgement is made as to whether the machining direction suitable for each pattern element is forward or backward. As a result, each pattern element is classified into one of four machining kinds such as inner diameter forward machining, inner diameter backward machining, outer diameter forward machining and outer diameter backward machining, to generate the after-machining-shape classification data SC (Step S102).

Next to this, the feature extracting section 6 extracts among a series of pattern elements which forms the after-machining shape SB, features of pattern element shapes which affect and determine the machining methods necessary for the pattern elements to be machined. The extracted features are stored as the shape features SD in the feature temporary memory 7 (Step S103). The feature judging section 8 reads out the machining method judgement parameters SE stored in the parameter storing section 19 via the parameter temporary memory 20 (Step S104), and compares them with the shape features SD stored in the feature temporary 7 to generate the feature comparison data SF. Subsequently, the machining method determining section 9 determines the machining methods based on the feature comparison data SF (Step S105), whereby all procedures are completed.

Figure 3:
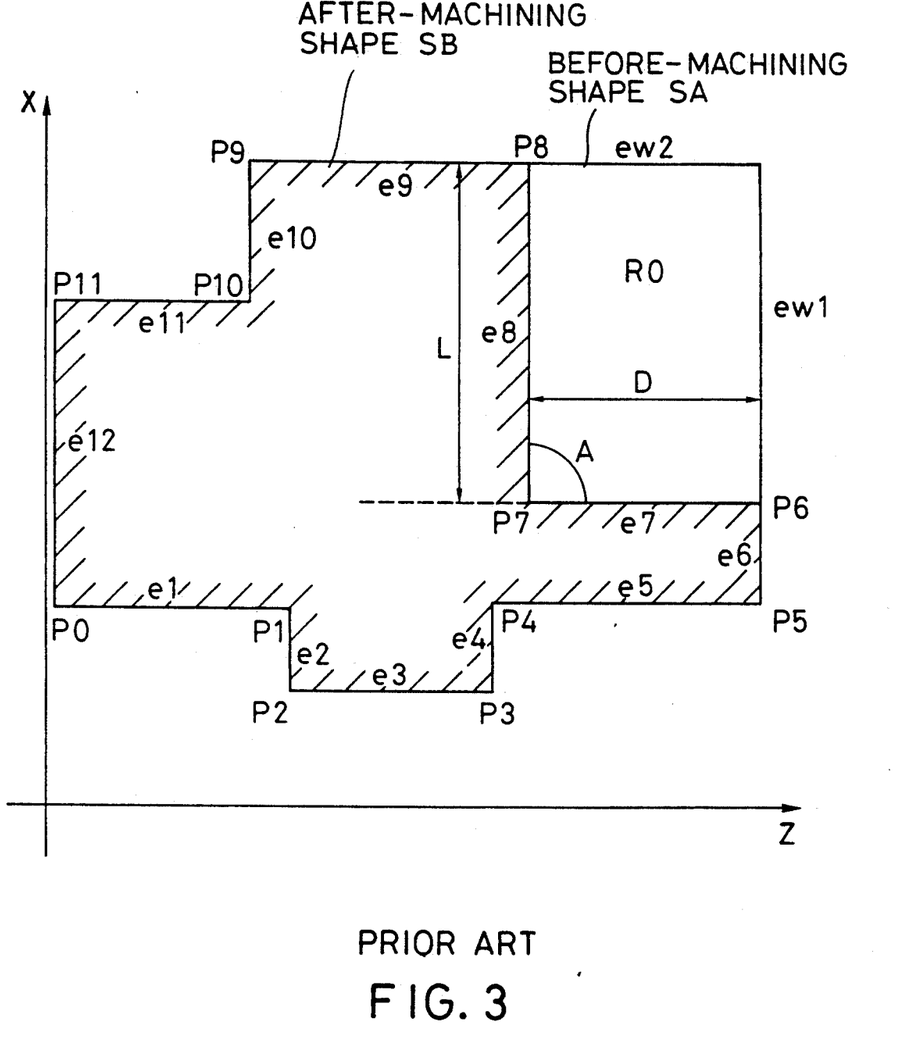
FIG. 3 is a diagram showing an example of the relationship between a before-machining shape, an after-machining shape and a machining region of a numerical information control information apparatus conventionally used.

In a case where a machining method is determined, for example, according to the before-machining shape SA and the after-machining shape SB as shown in FIG. 3, at first, a point at which the Z-coordinate value is minimum and the X-coordinate value is minimized in the pattern elements forming the after-machining shape SB is defined to be a search starting point P0. Then, the series of the pattern elements (P0, P1, ..., P11, e1, e2, ..., e12) which forms the after-machining shape SB, is sought sequentially from the search starting point P0, to determine an inner diameter-outer diameter dividing point P5 at which the Z-coordinate value is maximum and the X-coordinate value is minimized, an inner diameter forward/backward dividing point P2 at which the X-coordinate value is minimum and the Z-coordinate value is minimized, and an outer diameter forward- /backward dividing point P9 at which the X-coordinate value is maximum and the Z-coordinate value is minimized.

Next, the pattern elements e1 through e12 are divided into four groups, that is, the pattern elements (e1 and e2) which are located between the search starting point P0 and the inner diameter forward/backward dividing point P2; the pattern elements (e3, e4 and e5) which are located between the inner diameter forward/backward dividing point P2 and the inner diameter/outer diameter dividing point P5; the pattern elements (e7, e8 and e9) which are located between the inner diameter/outer diameter dividing point P 5 and the outer diameter forward/backward dividing point P9; and the pattern elements (e10, e11 and e12) which are located between the outer diameter forward/backward dividing point P9 and the search starting point P0. The divided four group of pattern elements are classified respectively to be subjected to the inner diameter backward direction machining (for the elements e1 and e2), the inner diameter forward direction machining (for the elements e3, e4 and e5), the outer diameter forward direction machining (e6, e7, e8 and e9), and the outer diameter backward direction machining (e10, e11 and e12). In FIG. 3, the pattern elements needed to be subjected to the cutting process are the pattern elements e7 and e8, so that the machining method to be practiced is determined to be the outer diameter forward direction machining.

Moreover, for the pattern elements which are needed to be machined, an angle A made between the pattern element and the Z-axis, a pattern element length L in the direction of the X-axis, and a cutting stock D are extracted as the shape features SD which are determining factors for the machining method. These extracted features are compared respectively with the machining method judgement parameters SE stored in advance, consisting of a limiting value PA of the angle, a limiting value PL of length in the X-axis direction, and a limiting value PD of the cutting stock. Here, if the compared resultant satisfies the all of the following equations (1), (2) and (3), the machining method for the pattern element in question is determined as to be a face machining, and if any of the three equations (1) to (3) is not satisfied, the machining method for the pattern element is determined as to be a longitudinal machining.

$$A \geqq PA \quad (1)$$

$$L > PL \quad (2)$$

$$D \leqq PD \quad (3)$$

Figure 4:
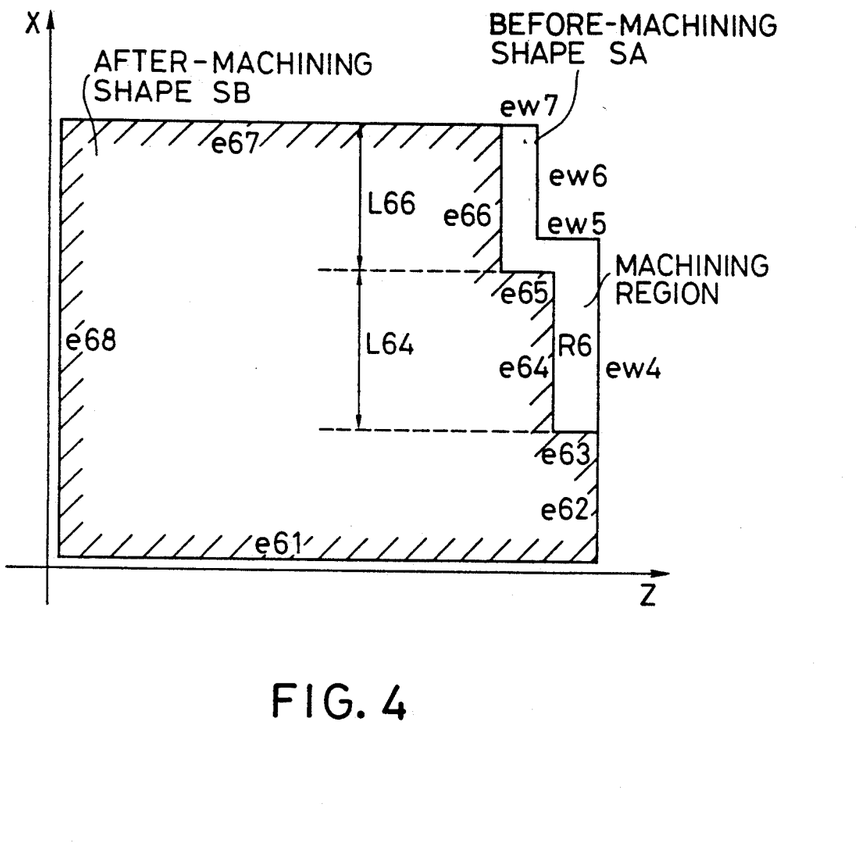
FIG. 4 is a diagram showing an example of the relationship between a before-machining shape, an after-machining shape and a machining region of a numerical control information generating apparatus according to a prior art and this invention.

In the conventional numerical control information generating apparatus detailed above, in judging whether the machining method necessary to obtain an after-machining shape from a before-machining shape is composed of a face machining or a longitudinal machining, the machining method is judged separately for each pattern element, so that the machining methods may not be properly optimized as compared with the case where the all machining regions are considered as a whole. In a case where, for example, a machining method is determined for an element having a before-machining shape and an after-machining shape as shown in FIG. 4, if the length L64 of the X-axis direction in the pattern element e64, and the length L66 of the X-axis direction in the pattern element e66 satisfy the following equations (4) and (5) respectively, the pattern element e64 as well as the pattern element e66 are determined to be subjected to the longitudinal machining.

$$L64 \leqq PL \quad (4)$$

$$L66 \leqq PL \quad (5)$$

However, when a skilled machining operator considers the machining method assuming the machining region R6 as one pattern element, the operator usually adopts a face machining to machine the machining region R6. Accordingly, in order to obtain the optimum machining method for each pattern element, the operator must manage to change or amend the generated operation step data and the numerical control information based on the determined machining method, thus giving rise to a difficulty in this system.

SUMMARY OF THE INVENTION

This invention has been accomplished in view of what is discussed above, and an object of this invention is to provide a numerical control information generating apparatus capable of determining a machining method optimally suitable for a region of the shape to be machined.

According to one aspect of this invention, for achieving the objects described above, there is provided a numerical control information generating apparatus wherein a numerical control information is generated by determining a machining method from a before-machining shape and an after-machining shape, which comprises: a generating means for generating a machining region from said before-machining shape and after-machining shape; a judging means for judging pattern elements forming an angle to a Z-axis of more than a predetermined numeral value among the series of pattern elements constituting the generated machining region; a dividing means for dividing said machining region by lines which are parallel to the Z-axis and each pass through a corresponding starting point of a judged pattern element and lines which are parallel to the Z-axis and each pass through a corresponding end point of the said judged pattern element; and a uniting means for uniting divided machining regions based on predetermined parameters so as to determine a machining method for the united machining region.

These together with other objects, features and advantages of the invention will become more readily apparent from the following detailed description when taken in conjunction with the illustration embodiment in the accompanying drawings.

DESCRIPTION OF THE PREFERRED EMBODIMENT

Figure 5A:
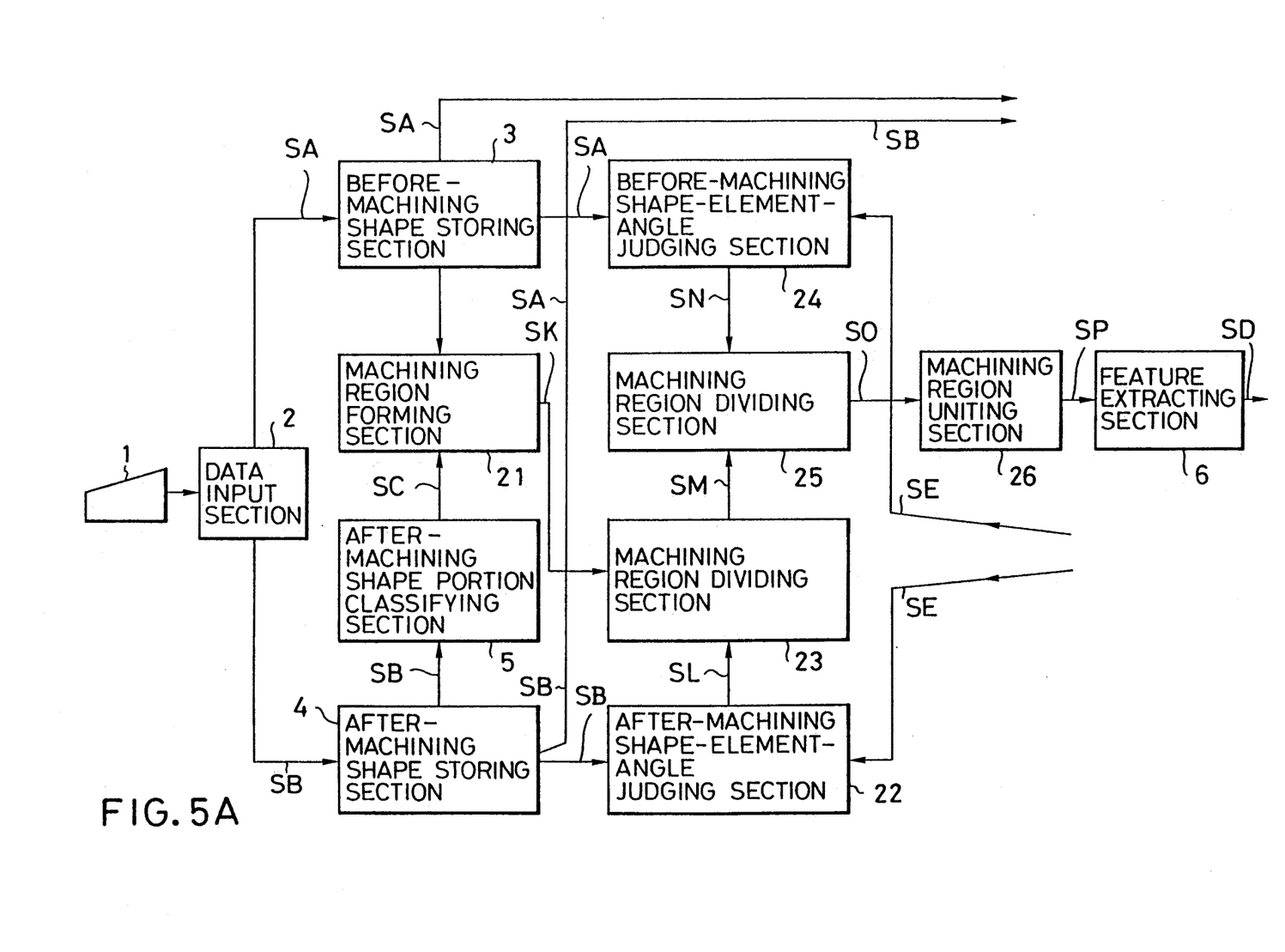
FIGS. 5A and 5B are block diagrams showing an example of a numerical control information generating apparatus of this invention.
Figure 5B:
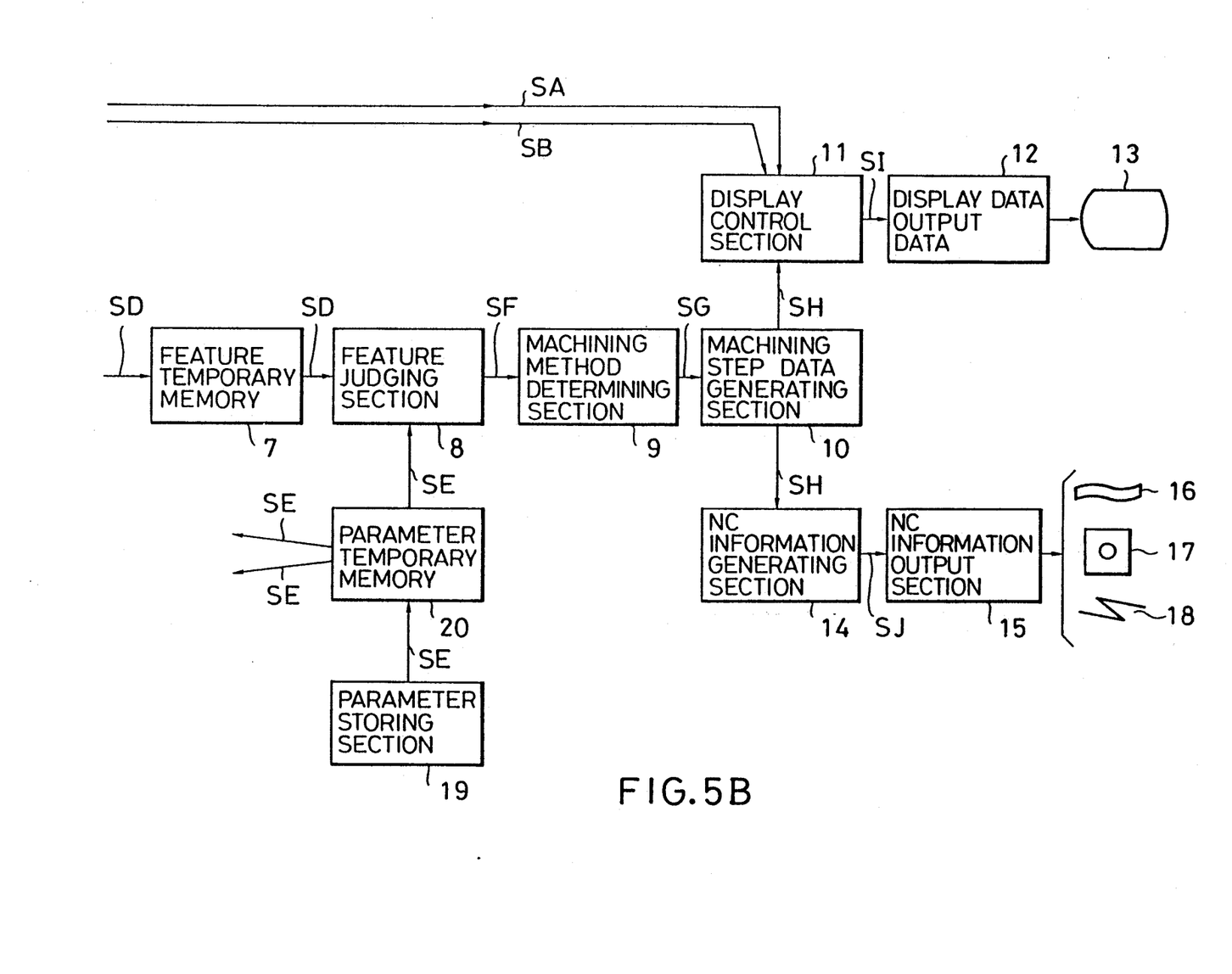
Figure 8:
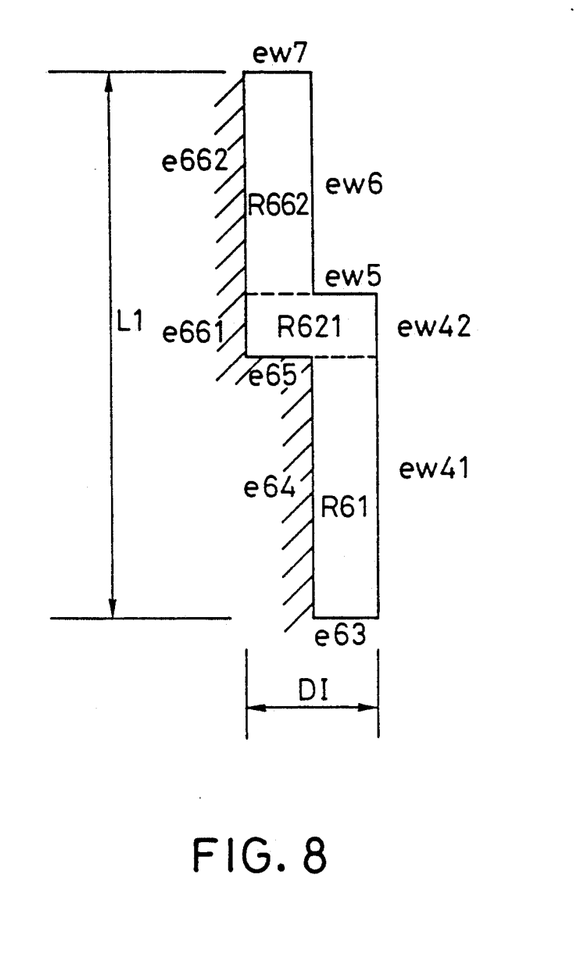

A block diagram of an example of a numerical control information generating apparatus according to this invention is provided in FIGS. 5A and 5B, which are shown in correspondence with FIG. 8, and the same constituents are identified by the same numerals to avoid repeating the explanation thereof.

A before-machining shape SA is inputted through an operation control panel 1 of a data input section 2 by an operator to be stored in a before-machining shape storing section 3. The before-machining shape SA is read in and analyzed by a machining region forming section 21 together with after-machining-shape classification data SC transmitted from an after-machining shape-portion classifying section 5, to form a machining region SK. The formed machining region SK is further transmitted to a machining region dividing section 23 based on after-machining-shape elements. On the other hand, an after-machining shape SB which is inputted through the operation control panel 1 of the data input section 2 by the operator and is stored in an after-machining shape storing section 4, is read into an after-machining shape-element-angle judging section 22. In this section, the after-machining shape SB is decomposed into pattern elements, and each angle made between the corresponding pattern element and the Z-axis is compared and analyzed with machining-method judgement-parameters which are read out of a parameter temporary memory 20 into the after-machining shape-element-angle judging section 22. Subsequently, each of the pattern elements is subjected to judgement as to whether it belongs to the face machining element, or to the longitudinal machining element, and transmitted as machining method data SL for each after-machining shape element, to the machining region dividing section 23 based on the after-machining shape elements.

The machining region SK, which was transmitted from the machining region forming section 21 to the machining region dividing section 23 based on the after-machining shape elements, is divided based on the machining method data SL for each after-machining shape element which was transmitted from the after-machining shape-element-angle judging section 22 to the machining region dividing section 23 based on the after-machining shape elements. The divided region is transmitted to a machining region dividing section 25 based on the before-machining elements as a machining region SM for the first dividing step.

On the other hand, the before-machining shape SA, which was inputted through the operation control panel 1 of the data input section 2 by the operator and has been stored in the before-machining shape storing section 3, is read into a before-machining shape-element-angle judging section 24 to be decomposed into pattern elements which constitute the before-machining shape SA. Then, the angle made between each pattern element and the Z-axis is compared and analyzed with the machining method judgement-parameters fed from the parameter temporary memory 20 to the after-machining shape-element-angle judging section 22. There each pattern element is subjected to the judgement as to whether it is the face-machining element or the longitudinal machining element, and the judged pattern element is transmitted to the machining region dividing section 25 based on the before-machining shape elements as machining method data SN for each before-machining shape element.

Next, the machining region SM for the first dividing step transmitted from the machining region dividing section 23 based on the after-machining shape elements to the machining region dividing section 25 based on the before-machining shape elements, divided according to the machining method data SN for each before-machining shape element transmitted from the before-machining shape-element-angle judging section 24 to the machining region dividing section 25 based on the before-machining shape elements, to be transmitted as a machining region SO for the second dividing step to a machining region uniting section 26. The machining region SO for the second dividing step transmitted from the machining region dividing section 25 based on the before-machining shape elements to the machining region uniting section 26, is to be united and transmitted as a united machining region SP to a feature extracting section 6.

Figure 6:
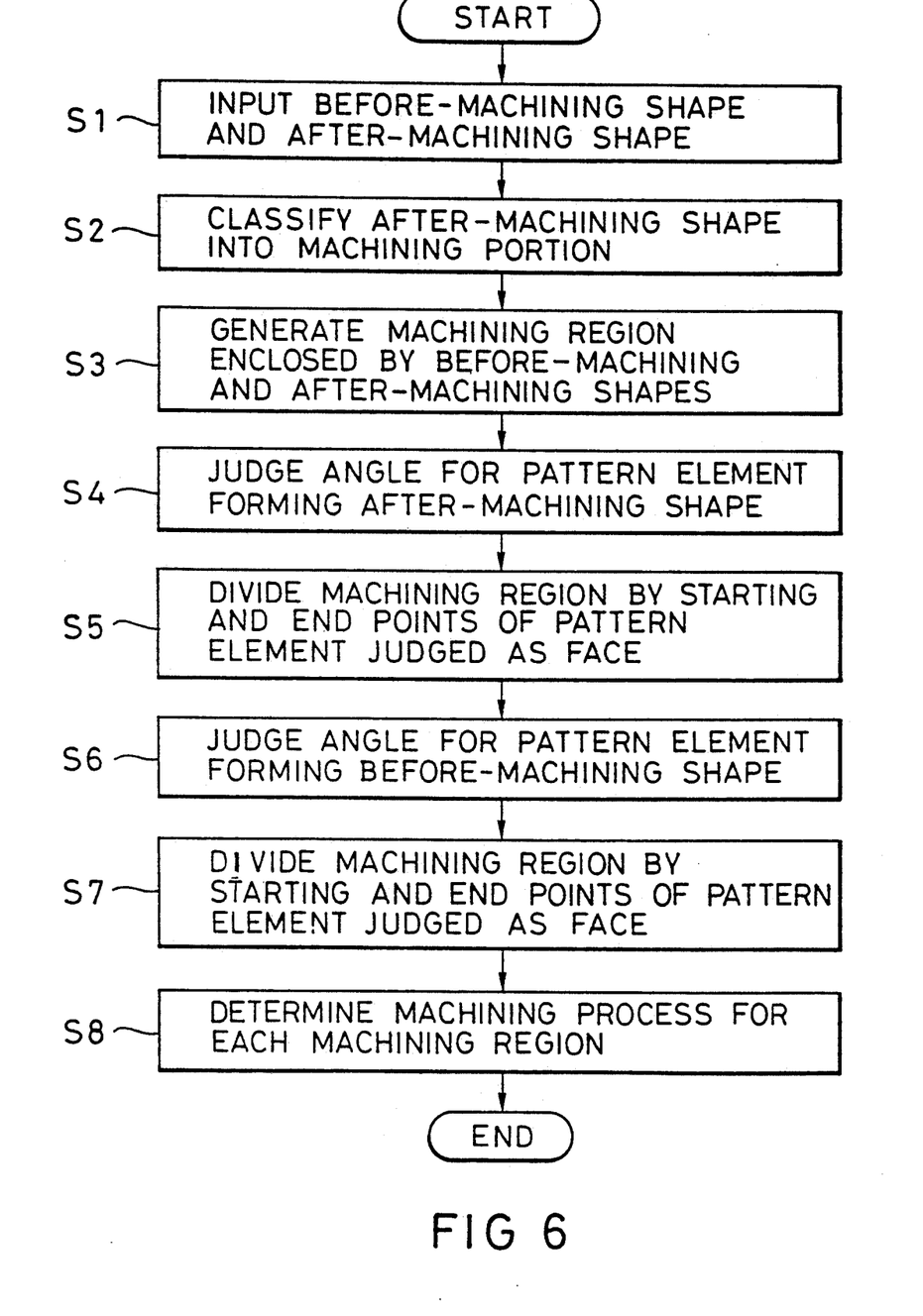
FIG. 6 is a flow chart showing the operational example of the same.

FIG. 6 is a flow chart showing an operational example of the numerical control information generating apparatus described heretofore according to this invention. At first, the data input section 2 stores the before-machining shape SA and the after-machining shape SB, which are inputted through the operation control panel 1 by the operator, in the before-machining shape storing section 3 and the after-machining shape storing section 4, respectively (Step S1). The before-machining shape-portion classifying section 5 loads the after-machining shape SB stored in the after-machining shape storing section 4 to be decomposed into pattern elements. In this classifying section 5, the machining portion is determined to be an inner- or outer-diameter portion so as to be suitable for each pattern element, and further the cutting direction is selected from forward and backward directions so as to be suitable for each pattern element, whereby each pattern elements is classified into four kinds, that is, the inner-diameter forward-direction machining, the inner-diameter backward-direction machining, the outer-diameter forward-direction machining and the outer-diameter backward-direction machining so as to generate the after-machining-shape classification data SC (Step S2). The machining region forming section 21 reads and analyzes the after-machining shape classification data SC generated in the after-machining shape-portion classifying section 5 and the before-machining shape SA stored in the before-machining shape storing section 3, in order to generate the machining region SK, thereby transmitting it to the machining region dividing section 23 based on the after-machining shape elements (Step S3).

On the other hand, the after-machining shape-element-angle judging section 22 reads out the after-machining shape SB stored in the after-machining shape storing section 4 to decompose it into the pattern elements. Then, an angle A formed between each pattern element and the Z-axis is compared with the angle limiting value PA of the machining method judgement-parameters SE stored in the parameter temporary memory 20. In this case, if the following equation (6) is satisfied, the pattern element is determined to be a face machining element, and otherwise, the pattern element is determined to be a longitudinal machining element. The resultant is defined as machining method data SL for each machined shape element, and is transmitted to the machining region dividing section 23 based on the after-machining shape elements (Step S4).

$$A \geq PA \tag{6}$$

The machining region dividing section 23 based on the after-machining shape elements divides the machining region SK read out of the machining region forming section 21 by a straight line which is parallel to the Z-axis and passes through the starting point of each machining element judged as an facing operation element in the machined-shape-element-angle judging section 22, and by a straight line which is parallel to the Z-axis and passes through the end point of the aforementioned machining element (Step S5). Thus the machining region SM for the first dividing step SM is generated and transmitted to the machining region dividing section 25 based on the before-machining shape elements.

On the other hand, the before-machining shape-element-angle judging section 24 reads out the before-machining shape SA stored in the before-machining shape storing section 3 to decompose it into the pattern elements. Then, an angle Aw formed between each pattern element and the Z-axis is compared with the angle-limiting value PA of the machining method judgement-parameters SE stored in the parameter temporary memory 20. In this case, if the following equation (7) is satisfied, the pattern element is determined to be a face machining element, and otherwise, the pattern element is determined to be a londitudinal machining element. The resultant is defined as a machining method data SN for each before-machining shape element, and is transmitted to the machining region dividing section 25 based on the before-machining shape elements (Step S6).

$$Aw \geq PA \tag{7}$$

The machining region dividing section 25 based on the before-machining shape elements divides the step machining region SM for the first dividing step read out of the machining region dividing section 23 by the after-machining shape elements by a straight line which is parallel to the Z-axis and passes through the starting point of each machining element judged as an end face machining element in the before-machining shape-element-angle judging section 24, and by a straight line which is parallel to the Z-axis and passes through the end point of the aforementioned machining element (Step S7). Thus the machining region SO for the second dividing step is generated and transmitted to the machining region uniting section 26.

In the step where the machining region is divided up to the machining region SO for the second dividing step, if the machining region SK is divided into small N-machining regions (here, the numeral "N" denotes a natural number), by considering and making among the N small-machining regions, a united machining region consisting of combinations of (N−K) small-machining regions being connected to one another (here, the numeral "K" denotes a natural number and satisfies $0 \leq K < N$), the judgement of the machining method is made on the united regions (Step S8), and all operations are completed.

Figure 7:
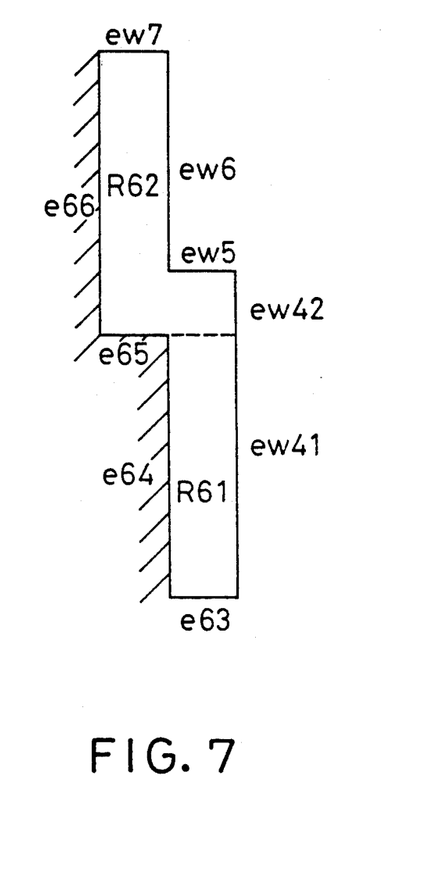
FIGS. 7 and 8 are diagrams for explaining the machining region in FIG. 9.

At the above Step S1 in the flow chart of FIG. 6, when a before-machining shape SA and an after-machining shape SB as shown in FIG. 4 are inputted, the machining region is defined as indicated by a region R6. The machining region R6 is divided by straight lines which are parallel to the Z-axis and respectively pass the starting points of the pattern elements e66 and e64 each forming the face machining element of the after-machining shape SB and by lines which are parallel to the Z-axis and respectively pass the end points thereof, into two machining regions R61 and R62 for the first dividing step as shown in FIG. 7. Subsequently, the machining regions R61 and R62 for the first dividing step are further divided by lines which are parallel to the Z-axis and respectively pass the starting points of the pattern elements ew6 and ew4 each forming the corresponding face machining element of the before-machining shape SA and by lines which are parallel to the Z-axis and respectively pass the end points thereof, into machining regions R61, R621 and R622 for the second dividing step as shown in FIG. 8.

Figure 9:
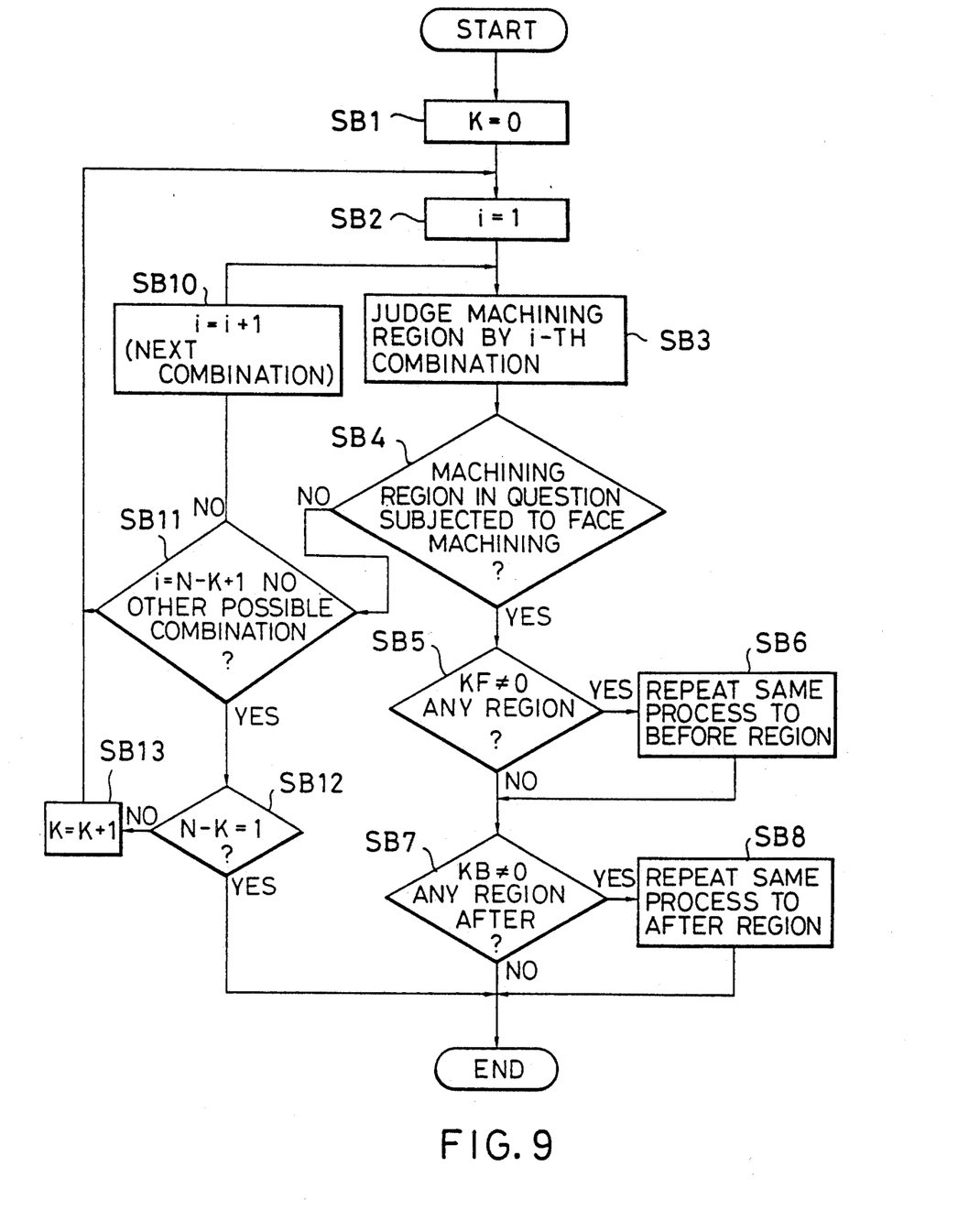
FIG. 9 is a flow chart explaining in detail the operational example of the main portion of the numerical control information generating apparatus of this invention.

FIG. 9 is a flow chart for explaining in detail the procedure of the step S8 of FIG. 6 at which the machining method is determined for the united region which is formed in combination of the small-machining regions. At first, the initial value of "K" is set to be zero, the machining method is determined assuming the whole region consisting of N small-machining regions as one united machining region (Step SB1). Generally, in a case where small-machining regions are arranged in a row and among them J small-machining regions adjacent to each other are picked up, there exist (N−J+1) kinds of such combinations. By making, in turn, combinations of the (N−K) small-machining regions adjacent to each other among the N small-machining regions, a united machining region to be subjected to the determination of a machining method is determined, and then the united machining region is judged as to whether or not it is to be subjected to the face machining (Steps SB2, SB3 and SB4).

Now, an explanation is presented regarding the method of determining the machining method in accordance with a united machining region consisting of the (N−K) small-machining regions. If the length LI in the direction of the X-axis and the length DI in the direction of the Z-axis of the united machining region satisfy respectively the following equations (8) and (9) for the limiting value PL of the length along the X-axis and the limiting value PD of the length along the Z-axis, this united machining region becomes subjected to the face machining.

$$LI \geq PL \tag{8}$$

$$DI \leq PD \tag{9}$$

In addition, as the items for judging whether or not a united machining region is subjected to the face machining, it is possible to add, if necessary, other items such as an angle formed between the Z-axis and the pattern element constituting the after-machining shape among the pattern elements forming the united machining region, the ratio of the aforementioned lengths LI to DI and the like. In this example, the judgement is made using the above equations (8) and (9).

In the case where a united machining region consisting of the (N−K) small-machining regions adjacent to one another at the Step SB4, is judged as to be subjected to the face machining, if there exists any small-machining region before the united machining region, the existing machining region before the united machining region is to be subjected to the determination procedures of the machining method-from the above Step SB1 (Steps SB5 and SB6). On the other hand, if there exists any small machining region after the united machining region, the existing machining region after the united machining region is to be subjected to the determination procedures of the machining method from the above Step SB1 (Steps SB7 and SB8). When no small-machining region exists either before or after the united machining region, the operation is to be completed.

On the other hand, in the case where a united machining region is judged as not to be subjected to the face machining, the judgement is made as to whether or not all possible united machining regions have been checked in accordance with the given number of the small-machining regions constituting a united machining region (Step SB11). If there remains any united machining region, the next-coming united machining region is processed from the Step SB3 (Step SB10). If there remains no more possible united machining region to be subjected to the judgement of the machining process in accordance with the given number of the small-machining regions constituting a united machining region, the judgement is made as to whether or not the number of the small-machining regions constituting a united machining region is equal to one, that is, (N−K)=1 (Step SB12). If the number of the small-machining regions is one, this indicates that all possible united machining region in accordance with all the varying numbers of the small-machining regions has been checked on the machining method, all operations are completed. In contrast, unless the number of the machining regions is equal to one, the value K is replaced by (K+1), or for the united machining regions having the number of the small-machining regions is reduced by one, and the process from the Step SB2 is effected (Step SB13).

Figure 10:
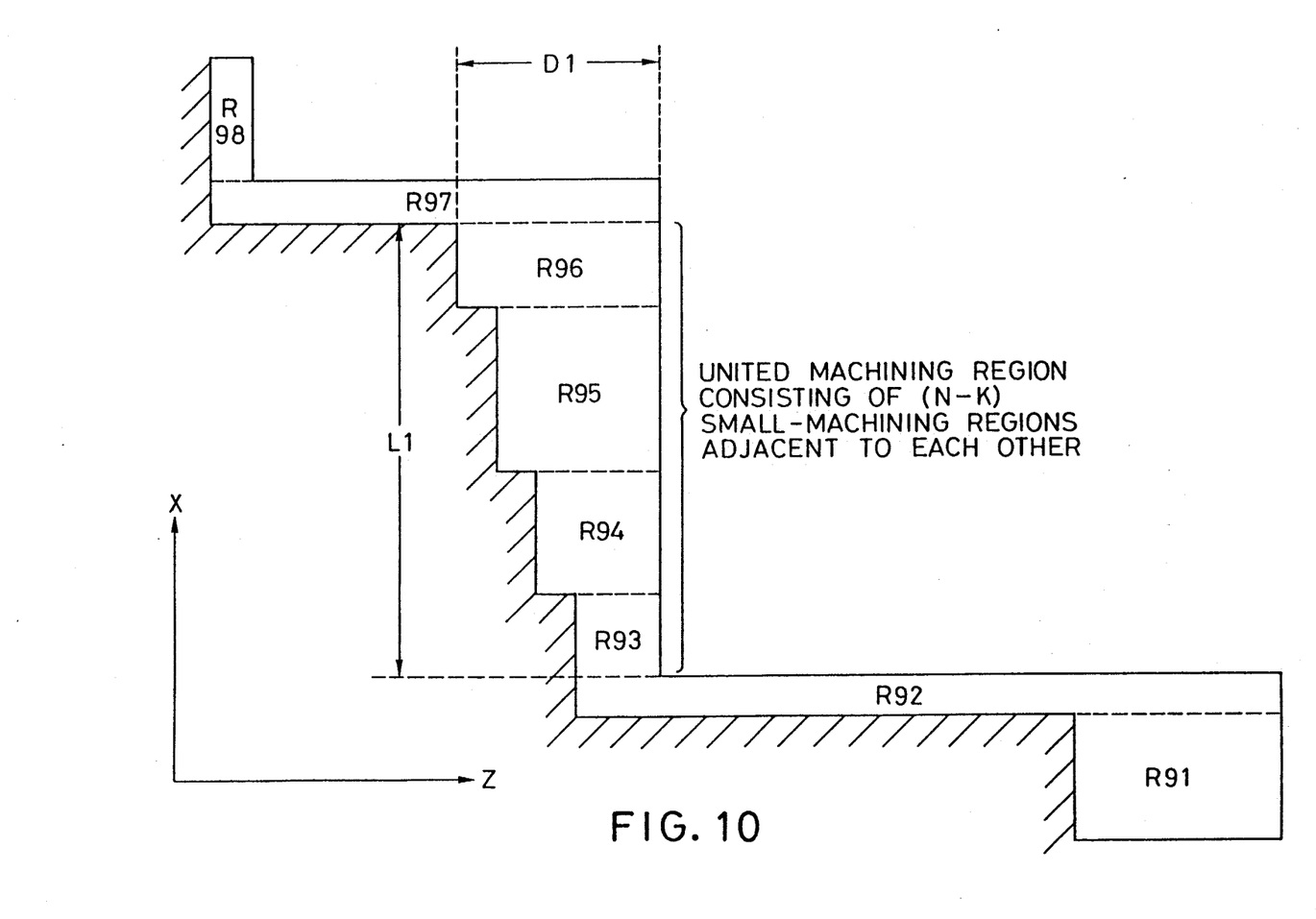
FIG. 10 is a diagram for explaining the machining region in FIG. 4 in reference to the flow chart of FIG. 9.

In the case where the united machining region is not determined to be subjected to the face machining by the above procedure, the united machining region is determined to be subjected to the longitudinal machining. In the case as shown in FIG. 10, for instance, where the machining region consist of eight small-machining regions R91 through R98, a united machining region is composed of small-machining-regions R93 to R96, and the relations DI≦PD and LI≧PL hold, so that this united machining region is subjected to the face machining.

As has been explained in detail heretofore, according to the numerical control information generating apparatus of this invention, in constituting a united machining region by making combinations of the divided machining regions, which is formed by dividing the machining region determined from the inputted before-machining region and the inputted machined region, a united machining region is determined selecting an optimum combination of machining region based on the parameters set in advance, and the machining method is determined for the united machining region. Therefore, the machining method is considered not for each pattern element but for the whole region to be machined, thus making it possible to determine an optimum machining method as a skillful operator will do. This enables the system to save time to amend the processing program and a lot of labour, and consequently to improve processing efficiency.

In the foregoing, the present invention has been described in conjunction with the preferred embodiments illustrated in the drawings. It should be however be appreciated that the invention is not restricted to these embodiments. Various modification and variations will readily occur to those skilled in the art without departing from the spirit and scope of the invention.

What is claimed is:

1. A numerical control information generating apparatus wherein a numerical control information is generated by determining a machining method from a before-machining shape and an after-machining shape, comprising: a generating means for generating a machining region constituted by a series of pattern elements from said before-machining shape and after-machining shape; a judging means for judging pattern elements forming an angle to a Z-axis of more than a predetermined amount among the series of pattern elements constituting the generated machining region, each of the judged pattern elements having a starting point and an end point; a dividing means for dividing said machining region by lines which are parallel to the Z-axis and which pass through respective starting points of said judged pattern elements and lines which are parallel to the Z-axis and which pass through respective end points of said judged pattern elements; a uniting means for uniting divided machining regions to obtain a united machining region based on predetermined parameters so as to determine a machining method for the united machining region.

2. A numerical control information generating apparatus as claimed in claim 1, wherein, when a machining method cannot be determined in accordance with said united machining region, a number of divided machining regions constituting said united machining region is incrementally reduced until a machining method can be determined.

* * * * *